(No Model.)
F. H. RICHARDS.
CRANK ARM ATTACHMENT.
No. 536,318. Patented Mar. 26, 1895.
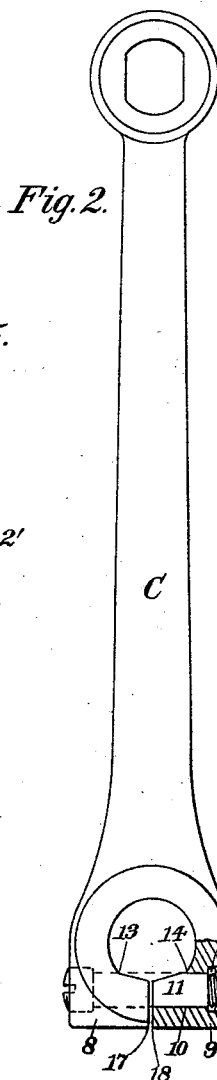
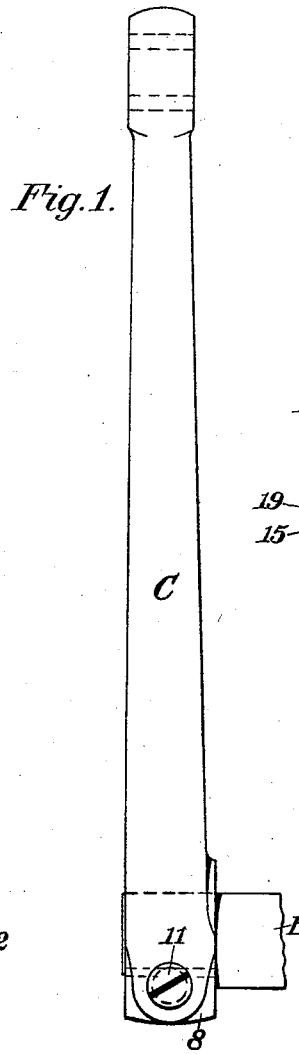
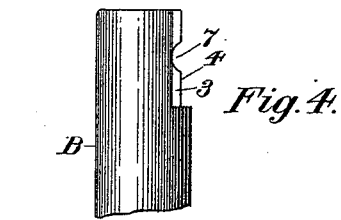
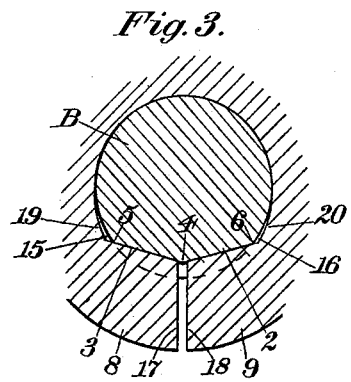
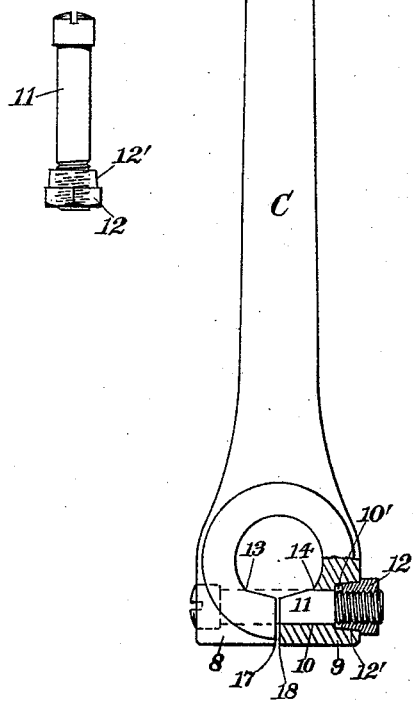
Witnesses:
J. L. Edwards Jr.
Fred. J. Dole.
Inventor:
F. H. Richards.

UNITED STATES PATENT OFFICE.

FRANCIS H. RICHARDS, OF HARTFORD, CONNECTICUT.

CRANK-ARM ATTACHMENT.

SPECIFICATION forming part of Letters Patent No. 536,318, dated March 26, 1895.

Application filed June 25, 1894. Renewed February 26, 1895. Serial No. 539,810. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Crank-Arm Attachments, of which the following is a specification.

This invention relates to improvements in crank-arm attachments; the object of the invention being to furnish an attachment or fastening especially adapted for securing pedal-arms or cranks on the pedal-shafts of bicycles, and to increase and multiply the clamping effect of the ordinary divided collar or hub by the addition to and incorporation with the clamping principle embodied therein, of the wedge principle, so that the holding effect of a divided hub and its clamping-bolt shall be increased and multiplied by a wedging effect obtained in the same direction and tending to the same end as the clamping effect, whereby the resultant of the two forces acting in unison will greatly increase the solidity of the bearing between the shaft and the hub or crank-arm.

In the drawings accompanying and forming a part of this specification, Figure 1 is an edge elevation of a bicycle-crank-arm and crank-shaft embodying my invention. Fig. 2 is a side elevation of the same, partially in section. Fig. 3 is an enlarged transverse sectional detail of the shaft and its hub. Fig. 4 is an elevation detail of the shaft, and Fig. 5 is a detail of the clamping-bolt and its locking-nut.

Similar characters designate like parts in all the figures.

According to my present improvement, the under side of the shaft, which is designated in a general way by B, is cut away upon two intersecting planes, 2 and 3, to form a salient angle or wedge, the edge 4 of which wedge is slightly within the circumference of the shaft, in order that the angle thereat may be as obtuse as possible, so as to avoid undue friction. Where these planes, at their extreme edges, intersect the periphery of the shaft, two other salient portions or wedges, 5 and 6, are formed, one side of the wedge in each case being slightly rounded, owing to the circular conformation of the shaft. An under-cut groove or recess, 7, extends transversely from one wedge 5 through the wedge 4, and across to the opposite wedge 6, the inner wall of the recess being in a line connecting the edges or points of the outer wedges.

The pedal-crank, designated in a general way by C, is formed at its inner end with a divided hub or journal, the two sides of which are designated by 8 and 9. The bore of said hub is not, however, a pure annulus, viewed in cross-section, but is made up, as shown in Fig. 3, partly of a circle struck from the same center and upon the same radius as the shaft B, partly of a broached-out portion struck from a different center and with the same or a slightly larger radius, and partly of two plane surfaces separated by the usual dividing space, but parallel with the opposing plane-faces 2 and 3 of the shaft B; that is, they are set so that, if they intersected, the angle at the point of intersection would be the same as the angle at the edge of the wedge 4.

An aperture or tap, 10, extends through the hub and centrally through the outer walls thereof, being enlarged at each end to accommodate, respectively, the head of a clamping-bolt, 11, and the nut 12 secured upon the screw-threaded end of said bolt, for obtaining and maintaining the approximate juxtaposition of the meeting portions of the said divided hub. The inner wall of this recess intersects the journal at two points, 13 and 14, which correspond with the points of the wedges 5 and 6. The enlarged portion 10' of the bore or tap 10 has sloping walls to accommodate the conical portion 12' of the nut 12, so that when the bolt 11 is in position it will not work loose, but will be firmly secured by the wedging of the nut against the walls of said enlarged portion of the cap or bore. It will now be evident that, when the end of the shaft B is encircled by the divided hub, there will normally be a small clearance space on each side of the shaft just above the termini of the annular portion thereof, before the bolt 11 is inserted in position and the two sides of the hub tightened upon the shaft. These clearance spaces are shown at 15 and 16 in Fig. 3. As soon, however, as the bolt is placed in its bore, and the nut 12 is screwed home upon the thread thereof, the faces 17 and 18 of the divided hub approach each other, by the riding down of their inner plane journal surfaces upon the corresponding planes 2 and 3 of the shaft. At the same time, the wedges 5 and 6, in connection with the force of the pull of the bolt, tend to spread the metal of the hub, and thus close up the spaces 15 and 16 until the surfaces 19 and 20 of the journal are substantially coincident with the adjacent portions of the periphery of the shaft.

The hold obtained upon the shaft by the hub, by the drawing-in of the adjacent plane surfaces of said hub and the wrapping or binding of the metal firmly around said shaft at all points, so as to produce a very close fit, is far superior to that obtained in the ordinary way by means of a divided journal and clamping-bolt alone. A further source of security is present in the wedging effect of the conical portion of the nut 12 against the correspondingly-sloped portion 10' of the aperture 10, as, when the bolt is once adjusted to lock the hub to the shaft, it cannot be worked loose by the rattling or jarring of the machine, the friction between the screw on the bolt and the hub, and thereby the crank, being greatly increased. The screw-thread should be very fine in order to still further increase this friction, and thereby the holding power of the bolt.

As shown, the head of the bolt should be on the under side of the crank-hub, so that, when the pedal secured thereto is forward of the crank-shaft, the clothing of the rider will not catch upon the hub. The corners and edges of the crank are, of course, rounded off in the usual manner.

Having thus described my invention, I claim—

1. In a crank-arm attachment, the combination with a shaft provided with a journal-surface partially curvilinear and partially composed of adjacent wedge-faces forming salient angles with said curvilinear surface, of a member having a divided hub whose journal-surface practically corresponds in outline with the journal-surface of the shaft but normally has enlarged clearance spaces adjacent to said salient angles and means for binding said hub to said journal-surface and simultaneously closing said clearance spaces by the wedging action of said respective salient angles and journal-surfaces of the shaft, whereby said hub and shaft are secured together by the clamping force exerted upon the shaft by the hub multiplied by the wedging force exerted upon the hub by the shaft, substantially as described.

2. In a crank-arm attachment, the combination with a shaft provided with a journal-surface partially curvilinear and partially composed of intersecting plane faces forming salient angles with said curvilinear surface, of a member having a divided hub whose journal-surface practically corresponds in outline with the journal-surface of the shaft but normally has enlarged clearance spaces adjacent to said salient angles, and means for binding said hub to said journal-surface and simultaneously closing said clearance spaces by the wedging action of said respective salient angles and journal surfaces of the shaft, whereby said hub and shaft are secured together by the clamping force exerted upon the shaft by the hub multiplied by the wedging force exerted upon the hub by the shaft, substantially as described.

3. In an attachment for a velocipede-crank and crank-shaft, a crank-shaft having a terminal journal-surface partially curvilinear and partially composed of intersecting plane faces forming salient angles with said curvilinear surface and with each other, a crank having a hub divided adjacent to the line of intersection of said planes, the journal-surface of which hub practically corresponds in outline with the journal surface of the shaft but normally has enlarged clearance spaces adjacent to said salient angles, a transverse aperture passing through the walls of the divided hub and through the plane faces of the crank-shaft, and an adjusting clamping-bolt working in said aperture and adapted to bind said hub to said journal-surface and simultaneously close said clearance spaces by the wedging action of said respective salient angles and journal-surfaces of the shaft, whereby said hub and shaft are secured together by the clamping force exerted upon the shaft by the hub multiplied by the wedging force exerted upon the hub by the shaft, substantially as described.

FRANCIS H. RICHARDS.

Witnesses:
EMORY C. WHITNEY,
FRED. J. DOLE.